Figure 1:
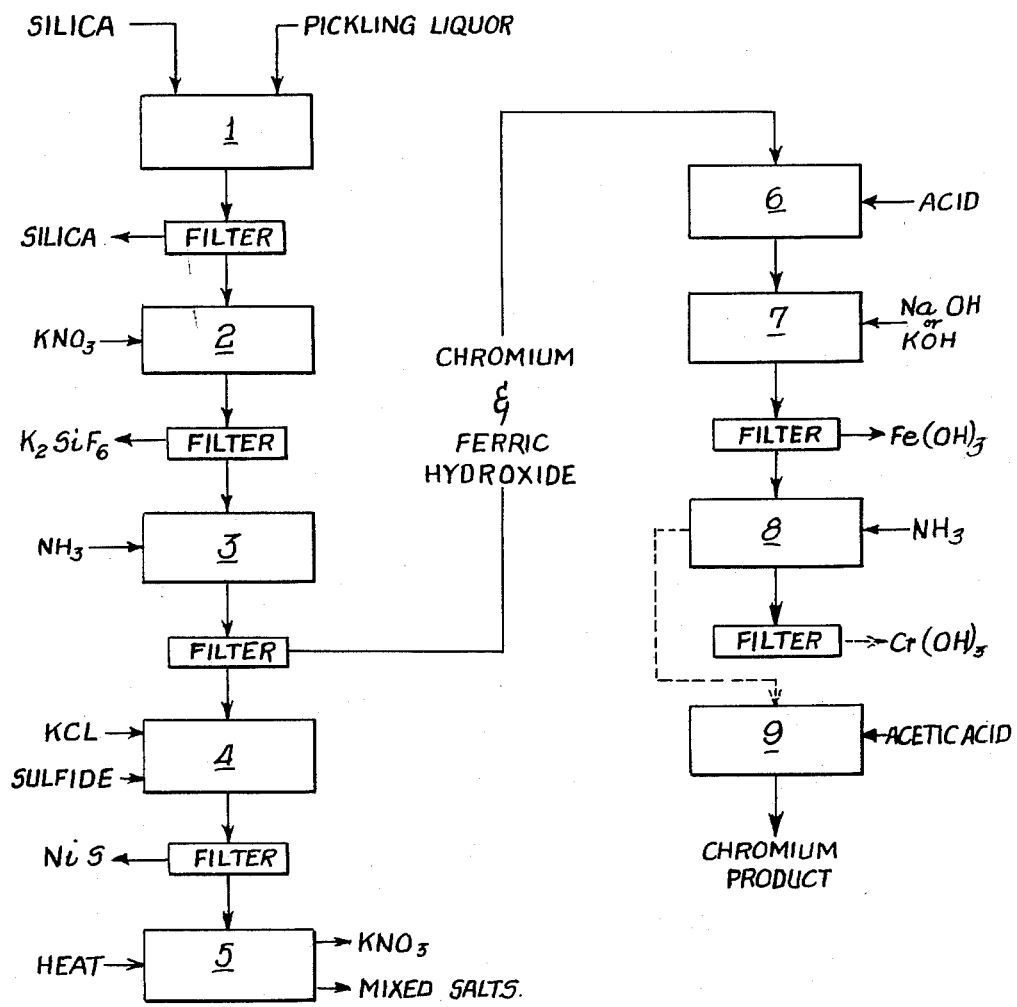

United States Patent Office 3,097,064
Patented July 9, 1963

3,097,064
RECOVERY OF VALUES FROM PICKLING LIQUOR
Paul Caldwell, Evergreen Park, Ill., assignor of one-half to Donald W. Lloyd, Chicago, Ill.
Filed Mar. 13, 1961, Ser. No. 95,411
18 Claims. (Cl. 23—88)

This invention is directed to the treatment of acidic pickling liquor which contains important fluorine, chromium, iron, nickel and nitrate values, the invention being directed to methods of recovering such values in commercially useable form.

In the production of stainless steel it is necessary to remove the mill scale or skin from the prepared metal to permit polishing. This is done by "pickling" the steel in a solution or liquor containing among other things, hydrofluoric and nitric acids. The acidic solution may, by way of example only, contain about 25% nitric acid and 2 to 7% hydrofluoric acid. Such pickling liquors often contain inhibitors of varying amounts such as chromium and nickel.

Used pickling liquor which is ready for discarding contains substantial values of fluorine, chromium, iron, nickel and nitrate which, if capable of separation, can be commercially valuable. By way of example only, certain forms of crystalline fluorides are useful in the vitreous enamel industry, ferrous iron in carbonate form is useful as a feed supplement, mixed cakes of chromium and iron in their hydroxide form may be used by the steel industry as a source of metals for various alloys, chromium in solution form may be used for plating, recovered nickel-containing compounds constitute a source of the fairly costly metal, and various forms of nitrate salts are used in the fertilizer industry. Waste pickling liquor constitutes a substantial problem for the steel industry with regard to disposal thereof. It has been estimated that at least 200,000 gallons of waste pickling liquor must be disposed of per month by an average size stainless steel producing plant. The disposal of such substantial quantities throughout the entire steel industry constitutes a major problem and prior to this invention there has been no commercially acceptable treatment used. Disposal is normally accomplished by the acquisition of large dumping areas, such as a quarry or the like, and the effect on surrounding water supply with regard to contamination thereof creates an additional problem to the independent disposal companies.

It is an object of the present invention to recover useful values from waste pickling liquor, the recovery involving the controlled treatment of a waste liquor to an extent that the waste liquor is completely disposed of without any attendant waste disposal problems.

A further object is to provide a new and improved method of treating acidic pickling liquor to recover therefrom the fluorine, chromium, iron, nickel and nitrate values which are commercially useable, the method involving low cost recovery operations of a nature which permits successful commercial utilization with profitable returns.

Figure 2:
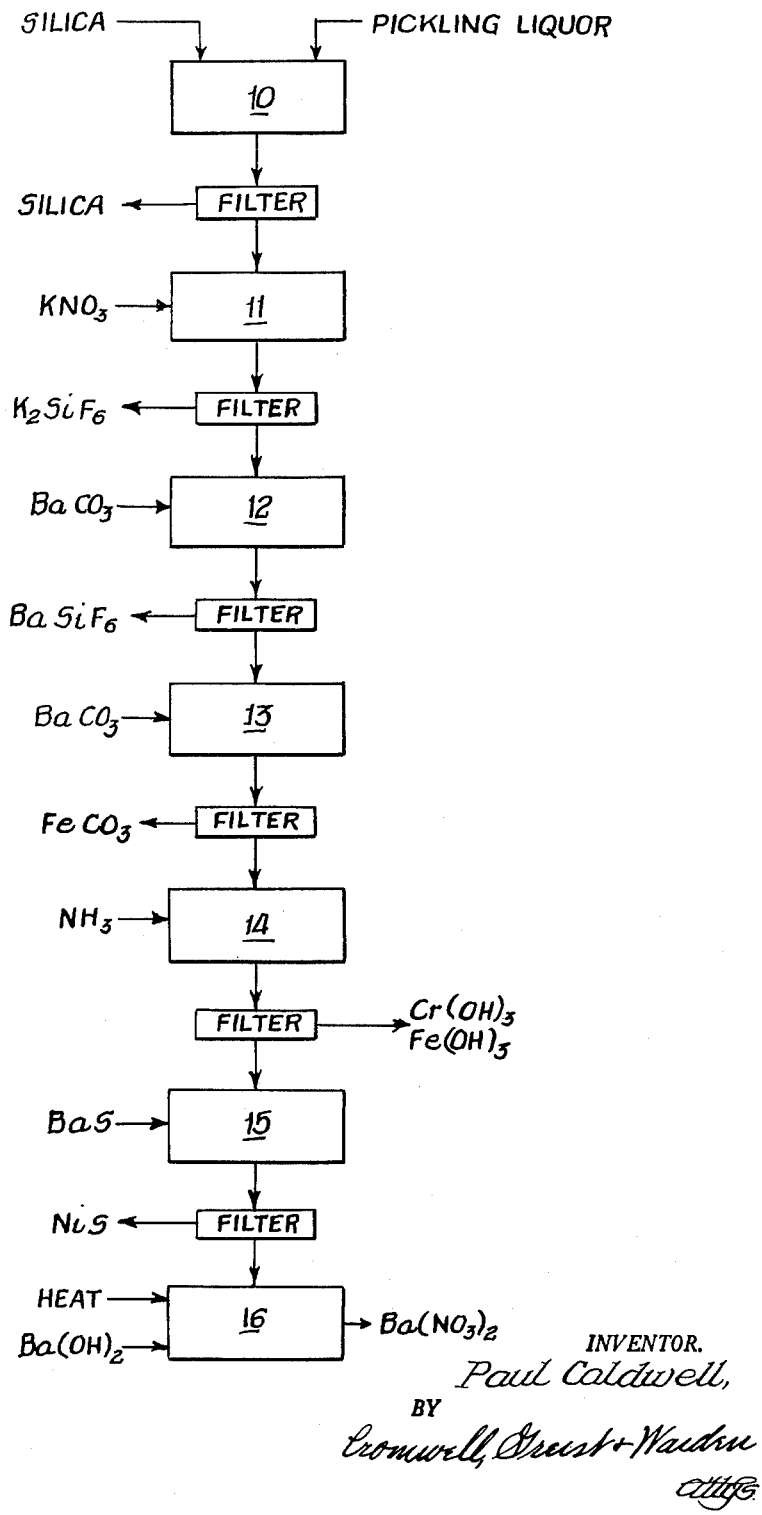

Other objects not specifically set forth will become apparent from the following detailed description of the invention made in conjunction with the accompanying drawings wherein:

FIG. 1 is a flow sheet of the basic pickling liquor value recovery method of the invention; and FIG. 2 is a flow sheet of a modified pickling liquor value recovery method also constituting a part of the invention.

Stainless steel pickling liquor will, of course, vary somewhat in composition. In carrying out the methods of the present invention, each batch of pickling liquor received for treatment would be analyzed for determination of the specific quantities of reagents to be used. Generally, stainless steel pickling liquor may have the following approximate composition:

| | Percent |
|---|---|
| Nitric acid | 26.0 |
| Hydrofluoric acid | 5.0 |
| Iron oxide | 2.5 |
| Chromium oxide | 1.2 |
| Nickel | 0.2 |
| Water | 65.1 |

The basic method of the present invention comprises first reacting the liquor with a suitable reagent which is soluble in the acid medium and is capable of combining with the fluorine value therein to form an insoluble fluorine compound. The insoluble fluorine compound is removed by filtering or the like and the remaining liquor is then ammoniated to neutralize the liquor and form a chromium and iron precipitate. This precipitate is removed and may be subjected to separation treatment if desired in a manner to be described. The neutral liquor is then subjected to nickel value recovery treatment such as by treating with a soluble agent capable of forming an insoluble nickel compound. The nickel precipitate is removed by filtering or the like and the remaining liquor is dried to recover a nitrate salt product therefrom.

Referring specifically to the flow sheet of FIG. 1, the preferred method will be described in conjunction with the use of preferred agents. The waste liquor in step 1 is agitated in a plastic lined tank with an excess of silica, such as 325 mesh sand, for a substantial period of time which may be on the order of 12 hours. The hydrofluoric acid of the liquor reacts with the silica to form hydrofluorosilicic acid according to the reaction:

(1)   $3H_2F_2 + SiO_2 \rightarrow H_2SiF_6 + 2H_2O$ 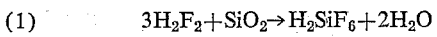

The liquor containing the silicofluoride is then held for settling and is subsequently pumped through a clarifying filter to a tank 2 where potassium nitrate is added for the purpose of forming acid insoluble potassium silicofluoride according to the reaction:

(2)   $H_2SiF_6 + KNO_3 \rightarrow K_2SiF_6 + 2HNO_3$ 

The potassium silicofluoride formed is removed from the liquor by filtering in a centrifugal filter or the like and the product obtained is in the form of a moist powder having about a 10% water content. When this product is dried it is a white powder containing approximately 99.9% potassium silicofluoride. The product is readily centrifuged and dried for bagging and sale. As mentioned above, this product is quite useful in the vitreous enamel industry.

Preferably, the procedure followed in forming the potassium silicofluoride involves the recycling of pickling liquor from which insoluble fluoride has previously been removed and to which the fresh potassium nitrate has been added, this quantity of nitrate being intended for treatment of the silicofluoride-containing fresh liquor. This preferred procedure may be carried out by collecting an adequate quantity of liquor in a holding tank, the liquor collected having previously been treated to form the potassium silicofluoride and this precipitate having been removed by filtering. The held fluorine-free liquor has added thereto the potassium nitrate intended for use as a reagent for fresh fluorine-containing liquor and the nitrate is placed in solution in this manner. After solvation and mixing of the reagent potassium nitrate in the fluorine-free liquor, this liquor is recycled into a holding tank conforming with step 2 of FIG. 1. The holding tank includes a quantity of fresh liquor which has been treated with silica and in this manner the potassium nitrate reacts to form the insoluble silicofluoride. In carrying out this preferred procedure, it has been found that the recycling of two volumes of reagent-containing and fluorine-free liquor to one volume of fresh liquor provides for a high yield of insoluble silicofluoride of excellent purity. The insoluble silicofluoride crystals formed are discrete and uniform and these factors aid materially in obtaining efficient washing of the product for purification thereof. While this preferred procedure has been described in conjunction with the use of specific reagents, it will be understood that this procedure may be of value where other reagents of the type to be specified are used and where silica itself is not involved as a reagent.

Step 3 of the method involves the addition of ammonia to the remaining liquor with ammoniation being carried out to an extent that the liquor is neutralized to about a pH of 7. The ammonia reacts with the nitric acid content of the liquor to form ammonium nitrate. The ammonia reacts with the ferric nitrate in the presence of water to form ammonium nitrate and ferric hydroxide. Similarly, the ammonia reacts with the chromium nitrate in the presence of water to form ammonium nitrate and chromium hydroxide. These reactions are as follows:

(3A) $HNO_3 + NH_3 \rightarrow NH_4NO_3$ (3B) $Fe(NO_3)_3 + 3NH_3 + 3H_2O \rightarrow 3NH_4NO_3 + Fe(OH)_3$ (3C) $Cr(NO_3)_3 + 3NH_3 + 3H_2O \rightarrow 3NH_4NO_3 + Cr(OH)_3$ In this neutral medium, the chromium and iron hydroxides are insoluble and these precipitates are then removed by filtering. These values in hydroxide form are readily removed by filtering and the mixed cake formed may either be dried and sold for subsequent iron and chromium value recovery or may be subjected to further processing as indicated in FIG. 1 and as will be subsequently described.

Following removal of the chromium and iron values, the remaining liquor is subjected to the treatment of step 4 of the process. The liquor contains ammonium nitrate, nickel and possibly minute traces of fluorine, chromium and iron. Preferably, in step 4 potassium chloride is added to the liquor in sufficient quantities to convert the ammonium nitrate to potassium nitrate according to the following reaction:

(4A) $NH_4NO_3 + KCl \rightarrow KNO_3 + NH_4Cl$

Following nitrate conversion, the solution is preferably heated to about 180° F. and a reagent capable of forming insoluble nickel salts in a neutral medium is added thereto. Preferably, a suitable sulfide, such as ammonium sulfide solution, is added to the heated liquor to precipitate the nickel as nickel sulfide in according with the following reaction:

(4B) $Ni(NO_3)_2 + (NH_4)_2S \rightarrow NiS + 2NH_4NO_3$

The nickel sulfide is removed by filtering which is accomplished very readily and the undried cake may either be sold as such or stored for conversion to the oxide for sale.

The remaining liquor or solution contains potassium nitrate and ammonium chloride in substantially equimolecular quantities. This solution is delivered into step 5 which constitutes an evaporator wherein the solution is concentrated and the crystals formed are removed by centrifuging or the like. Preferably, the solution is heated to a temperature of 114° C. at atmospheric pressure. Upon reaching this temperature the solution is cooled rapidly to about 25° C. and the crystals formed are recovered. These crystals are potassium nitrate of from about 95% to 98% purity, containing from about 2% to 5% ammonium chloride. The particular procedure described provides for the forming of small crystals of high purity.

Depending upon the presence of traces of metals in the final solution, the first evaporation step may result in the recovery of at least about ⅓ of the potassium nitrate. This particular product may be either dried for sale as the technical grade or may be further purified by re-crystallization for sale in the pure grade. Furthermore, enough of this material may be recycled to step 2 of the process for use in forming the potassium silicofluoride.

With regard to the recovery of further potassium and nitrogen values from the remaining solution following removal of the first potassium nitrate crystal batch, it may be desirable to re-ammoniate the remaining solution to bring down the traces of metals therein which have been concentrated by evaporation. Following removal of the traces of metals, the second evaporation step is continued to a small volume and the resulting crystals are a mixture of potassium nitrate and ammonium chloride containing about 20% N and 21% $K_2O$. These mixed salts may be dried for sale to the fertilizer industry. Any residual liquor may be recycled to step 1 of the process following adequate product recovery therefrom.

Depending upon the controls used in carrying out the method described, there may be traces of metals carried down to the final evaporation steps as indicated above. Similarly, there is the possibility that traces of fluorine might also be carried down. During the ammoniation step and nickel removal step, the fluorine trace will be converted to ammonium fluoride which is relatively soluble and, as it is not present in large amounts, will remain largely in solution and then be concentrated sufficiently to show up in the residual liquor after evaporation has been carried out to obtain a third crop of crystals. If it is considered desirable to remove the trace fluorine content, a soluble sodium salt, such as sodium carbonate, bicarbonate or nitrate, or a soluble calcium salt, such as calcium chloride or nitrate, may be added to precipitate the trace fluorine. While the calcium salt might be more effective in removing the trace fluorine, a product of sodium fluoride is more valuable and might well be preferred.

The following is a specific example of the method described.

*Example I*

248.5 lbs. of the liquor is reacted with an excess of finely ground silica from which 9.5 lbs. of silica is dissolved. The excess silica is removed by settling, filtering and washing. The total weight of filtrate and washings is 250.5 lbs. A solution is prepared by adding 17.3 lbs. of potassium nitrate to 462 lbs. of mother liquor from previous batches. This solution is heated to 50° C. and added to the 250.5 lbs. of silicated solution with agitation. The potassium silicofluoride is formed immediately and filtered from the slurry by a perforate basket centrifuge. The crystals are washed with two displacement washes and removed from the centrifuge and dried. 19.65 lbs. of potassium silicofluoride of 99.3% purity is recovered.

To the 308 lbs. of combined filtrate and washings, 13 lbs. of ammonia gas are added. This brings the pH of the solution to 7.0 and precipitates the iron and chromium from the solution as hydroxides. It also brings the temperature to 65° C. The combined precipitate is filtered from the solution on a continuous filter. It weighs 12.5 lbs. in the "as filtered" state containing 70.7% moisture.

To the 322 lbs. of filtrate and washings 45 lbs. of muriate of potash is added, the temperature is brought to 75° C. and 250 cc. of 28% ammonium sulfide solution is added with agitation. The nickel sulfide precipitate is removed and washed in a plate and frame filter. The dry weight of nickel sulfide is 0.708 lb.

The 364.5 lbs. of filtrate and washings are found to contain 60.8 lbs. of $KNO_3$ and 32.2 lbs. of $NH_4Cl$. This solution is evaporated to a boiling point of 114° C. at atmospheric pressure and cooled to 25° C. The resulting crystals are centrifuged and dried without washing and weigh 48.35 lbs. and contain 89.4% $KNO_3$.

The resulting mother liquor weighing 95.5 lbs. and containing 17.60 lbs. potassium nitrate and 27.1 lbs. of ammonium chloride is further evaporated to remove 28.5 lbs. of water and cooled to 25° C. The resulting crystals are centrifuged and dried without washing and found to weigh 20.9 lbs. and contain 10.8 lbs. of potassium nitrate and 10.1 lbs. of ammonium chloride.

The resulting mother liquor which weighs 51.0 lbs. and contains 6.8 lbs. of potassium nitrate and 17.1 lbs. of ammonium chloride is evaporated to remove 14.5 lbs. of water and cooled to 25° C. The resulting crystals are centrifuged and dried without washing and found to weigh 10.48 lbs. and contain 5.0 lbs. of potassium nitrate and 5.48 lbs. of ammonium chloride.

The resulting mother liquor which weighs 30.5 lbs. and contains 1.8 lbs. of potassium nitrate and 11.62 lbs. of ammonium chloride is held to be evaporated with the mother liquor from the first crop of crystals from succeeding batches.

Reagents used in step 2 of the method must be capable of forming acid insoluble fluorides. Examples of such reagents are as follows:

| | |
|---|---|
| Cerium nitrate | Rhodium nitrate |
| Thorium nitrate | Uranium nitrate |
| Gallium nitrate | Yttrium nitrate |
| Gadolinium nitrate | Calcium nitrate |
| Nickel nitrate | Magnesium nitrate |
| Platinum nitrate | |

Of the foregoing reagents, calcium and magnesium nitrates are preferred. Reagents capable of forming acid insoluble silicofluorides are as follows:

Barium nitrate
Potassium nitrate
Sodium nitrate

These reagents are also preferred and, where used, the liquor must first be treated with silica.

Reagents capable of forming nickel salts which are insoluble in a neutral medium are as follows:

| | |
|---|---|
| Sulfide | Selenide |
| Carbonate | Dimethylglyoxime |
| Cyanide | Ortho-phosphate |
| Ferrocyanide | Pyro-phosphate |
| Oxalate | Sodium hydroxide |
| Stearate | Potassium hydroxide |

Of the foregoing reagents, the sulfide, carbonate, cyanide, oxalate and sodium hydroxide are preferred. Especially with regard to the use of a sulfide, it is preferred that the reagent be added under controlled conditions, such as by titration, to avoid the addition of an excess. The various reagents listed above are added either in solution or are used in a state capable of double decomposition.

The side treatment of the chromium and ferric hydroxide in filter cake form is shown in FIG. 1. This material is delivered to step 6 of the method wherein it is redissolved in an appropriate acid such as nitric acid, sulphuric acid or acetic acid. The resulting solution is delivered to step 7 where a slight excess of sodium hydroxide or potassium hydroxide is added to reform the insoluble ferric hydroxide. In this manner, the chromium remains in solution and the iron value is separated as an insoluble hydroxide being removed by suitable filtering or the like. The chromium is in solution form as a nitrate, sulfate or acetate and can be used as a plating solution if desired. This solution can be further purified by treating the same in step 8 with a slight excess of ammonia thus bringing down the chromium hydroxide which can be removed by filtering. As chromium is a valuable by-product, the chromium-containing solution from step 8, may be delivered into step 9 and treated with acetic acid or other suitable acid to form a chromium solution suitable for use in electroplating.

The modified method of FIG. 2 illustrates the use of barium salts in obtaining an end product of barium nitrate. This method comprises the mixing of the pickling liquor and silica in step 10 with unreacted silica being removed by filtering. The liquor containing the silicofluoride is delivered to step 11 wherein it is treated with potassium nitrate. Potassium silicofluoride is formed and is removed by filtering. The remaining liquor passes to step 12 wherein barium carbonate is added. Initial addition of barium carbonate may result in the precipitation of any residual silicofluoride as barium silicofluoride which is then removed by filtering. The resulting liquor is introduced into step 13 where additional barium carbonate is added for the purpose of bringing down the iron value. The addition of barium carbonate continues until all ferrous iron is brought down as ferrous carbonate which is removed by filtering, washed and dried. Ferrous carbonate is commercially valuable as a feed supplement.

The liquor, following completion of step 13, contains barium nitrate, ferric nitrate, chromium nitrate and nickel nitrate. The liquor is delivered to step 14 wherein a slight excess of ammonia, either anhydrous or aqueous, is added thereto. This addition results in the raising of the pH to about 6 to 12 with a pH of 7 being preferred. Chromium hydroxide and ferric hydroxide precipitate from the solution during ammoniation and these values are removed for subsequent sale or treatment as described in conjunction with FIG. 1 above.

The remaining liquor is delivered to step 15 and is treated by titration with barium sulfide to avoid an excess of sulphur in the solution. Nickel sulfide is formed and is removed by filtering. In the event that too much barium sulfide is added during the nickel removal step 15, the excess sulphur may be removed by adding a stoichiometric amount of pure cupric oxide while agitating. The excess sulphur is precipitated as cupric sulfide and may be removed by filtering. In the event that other sulphur-bearing reagents are used, such as a thiosulfate, the excess may be oxidized to a sulfate with hydrogen peroxide and removed as barium sulfate.

The resulting liquor is then delivered to the first evaporation step 16 wherein it is heated under controlled conditions. Excess ammonia in the solution in the form of ammonium nitrate will preferably be treated with barium hydroxide to convert the same to barium nitrate. The treatment with barium hydroxide is carried out by controlling evaporation to the point that when the ammonium nitrate starts to crystallize, the barium hydroxide (or barium carbonate if preferred) is added to form volatile ammonia compounds. During evaporation the barium nitrate is crystallizing and this product is less soluble than the ammonium nitrate. Therefore, samples of the barium nitrate crystals being formed are checked from time to time and when traces of ammonium nitrate appear, the barium hydroxide treatment is carried out. In this regard, ammonium nitrate is about 20 times as soluble in hot water as barium nitrate and will not appear in the barium nitrate product until the concentration of the liquor increases considerably. The ammonium hydroxide formed by the treatment with barium hydroxide volatilizes during further evaporation. Recycling of residual liquor may be attended to as described in connection with FIG. 1 above. Barium nitrate is commercially valuable in connection with use in the manufacture of television picture tubes.

The following is an illustrative example of the method described in conjunction with FIG. 2.

*Example II*

To a charge of 1,000 gallons of the liquor there is added 232 lbs. of $SiO_2$. This batch is agitated as long as practical, at least 12 hours. The sand ($SiO_2$) should be as fine as practical to insure good reaction rate and ease of agitation. The sand should be as pure as is practical.

When reaction of the sand and the hydrofluoric acid is complete, the batch is allowed to settle and the clear liquor is decanted off. If there is the slightest trace of suspended matter the liquor is put thru a polishing filter. The temperature of the liquor is then adjusted to 120° F. or more and 778 lbs. of potassium nitrate dissolved in 2,000 gallons of mother liquor from a previous batch, at the same temperature, is added. The suspension is then cooled to 80° F. or lower and the resulting potassium silicofluoride is filtered out, washed with cold water, dried, screened and bagged ready for market. A batch produces about 848 lbs. of potassium silicofluoride depending upon the exact composition of the liquor. The liquor is checked at suitable intervals by adding an excess of $KNO_3$ to a small measured portion of the liquor and the amount of $KNO_3$ added to the main batch is adjusted according to the recovery of potassium silicofluoride recovered from the test batch.

The solution is then run to the carbonating tank and 353 lbs. of barium carbonate is dissolved therein. Barium silicofluoride is brought down at this point and is filtered out. Additional barium carbonate is added until precipitation of ferrous carbonate is complete. This is determined by testing the clear solution with more barium carbonate. During this treatment the solution is heated to about 180–200° F. to reduce the solubility of the ferrous carbonate by decomposing the carbonic acid and to prevent precipitation of barium nitrate. The ferrous carbonate is then filtered, washed, dried, screened and bagged for market.

The solution is pumped to the tank for completing the reaction with barium carbonate. A slight excess of the carbonate is added as indicated by some remaining undissolved. The suspension is maintained at the 180–200° temperature. It is settled and the liquor pumped to the ammoniating tank thru a polishing filter. The total amount of barium carbonate required is about 3,500 lbs., depending upon variations in the liquor.

In the ammoniating tank the solution is treated with either $NH_3$ or $NH_4OH$ to precipitate chromium and ferric iron. A slight excess is added as indicated by odor and failure to precipitate more chromium or iron in a test lot. The precipitate is then filtered out, probably on a plate and frame press, and washed prior to further treatment for separation and purification. About 667 lbs. of iron and chromium hydroxide are produced.

The main solution is then pumped to the sulfiding tank, maintaining the temperature, for removal of nickel. After determining nickel content of the solution, a calculated slight deficiency of barium sulfide solution is admitted and reacted. A small portion of the solution is then filtered and nickel content determined again, and a slight deficiency of barium sulfide added. By repeating this procedure the nickel content of the solution is reduced to the desired level without introducing large amounts of sulfide sulfur in the solution. The nickel sulfide is then filtered from the solution, washed and held for further disposition.

The purified barium nitrate solution, containing traces of ammonium nitrate, is pumped to the evaporator and the barium nitrate crystals are removed by centrifuging and washed, dried, screened and bagged or drummed. The solution has been held at 180–200° F. up to this time to prevent crystallization of barium nitrate. A large portion of this material is removed by cooling the solution before evaporation. The concentration is checked from time to time and, when needed, barium hydroxide is added to convert the ammonium nitrate to barium nitrate as follows:

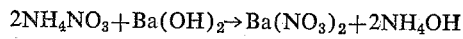

$$2NH_4NO_3 + Ba(OH)_2 \rightarrow Ba(NO_3)_2 + 2NH_4OH$$

and the ammonium hydroxide is boiled off.

The batch produces about 4,677 lbs. of barium nitrate depending upon the amount of nitric acid in the liquor and the amount of nitrate added as potassium nitrate.

Throughout the methods described, the temperature of the liquor may be varied to increase or decrease solubility of the various constituents. The specific examples set out herein illustrate temperature variation but such prescribed temperatures are not intended to be limiting. Certain specific preferred temperature conditions are referred to above and are claimed hereinafter only with regard to preferred embodiments of the invention.

Obviously certain modifications and variations of the invention as hereinbefore set forth may be made without departing from the spirit and scope thereof, and therefore only such limitations should be imposed as are indicated in the appended claims.

I claim:

1. The method of treating acidic aqueous pickling liquor containing fluorine, chromium, iron, nickel and nitrate values therein; said method comprising reacting said liquor with a soluble nitrate salt capable of forming an insoluble fluorine compound; removing said fluorine compound; ammoniating the remaining liquor to form a chromium and iron hydroxide precipitate; removing said precipitate; reacting the remaining liquor with a soluble agent capable of forming an insoluble nickel compound; removing the insoluble nickel compound; and drying the remaining liquor to recover a nitrate salt therefrom.

2. The method of claim 1 wherein the nitrate salt reaction comprises first adding the nitrate salt to liquor from which the insoluble fluorine compound has been previously removed, and adding the resultant salt-containing liquor to fresh fluorine-containing liquor.

3. The method of treating acidic aqueous pickling liquor containing fluorine, chromium, iron, nickel and nitrate values therein; said method comprising reacting said liquor with a soluble nitrate salt capable of forming an insoluble fluorine compound; removing said fluorine compound; ammoniating the remaining liquor to form a chromium and iron hydroxide precipitate; removing said precipitate; reacting the remaining liquor with a soluble agent capable of forming an insoluble nickel compound; removing the insoluble nickel compound; and drying the remaining liquor to recover a nitrate salt therefrom; said chromium and iron precipitate being redissolved by reacidification and treated with a slight excess of an alkali metal hydroxide to precipitate iron hydroxide which is removed leaving a chromium plating solution.

4. The method of treating acidic aqueous pickling liquor containing fluorine, chromium, iron, nickel and nitrate values therein; said method comprising reacting said liquor with a soluble nitrate salt capable of forming an insoluble fluorine compound; removing said fluorine compound; ammoniating the remaining liquor to form a chromium and iron hydroxide precipitate; removing said precipitate; reacting the remaining liquor with a soluble agent capable of forming an insoluble nickel compound; removing the insoluble nickel compound; and drying the remaining liquor to recover a nitrate salt therefrom; said drying being carried out by heating said liquor to about 114° C. followed by cooling to about 25° C. to form a crystalline product.

5. The method of treating acidic aqueous pickling liquor containing fluorine, chromium, iron, nickel and nitrate values therein; said method comprising reacting said liquor with silica and a soluble nitrate salt capable of forming an insoluble silicofluoride compound; removing said silicofluoride compound; ammoniating the remaining liquor to form a chromium and iron hydroxide precipitate; removing said precipitate; reacting the remaining liquor with a soluble agent capable of forming an insoluble nickel compound; removing the insoluble nickel compound; and drying the remaining liquor to recover a nitrate salt therefrom.

6. The method of treating acidic aqueous pickling liquor containing fluorine, chromium, iron, nickel and nitrate values therein; said method comprising reacting said liquor with silica and a soluble nitrate salt capable of forming an insoluble silicofluoride compound; removing said silicofluoride compound; ammoniating the remaining liquor to form a chromium and iron hydroxide precipitate; removing said precipitate; heating the remaining liquor to about 180° F. and reacting the same with a soluble sulfide agent capable of forming an insoluble nickel sulfide; removing the insoluble nickel sulfide; and drying the remaining liquor to recover a nitrate salt therefrom; said drying being carried out by heating said liquor to about 114° C. followed by cooling to about 25° C. to form a crystalline product.

7. The method of claim 6 wherein the nitrate salt reaction comprises first adding the nitrate salt to liquor from which the insoluble fluorine compound has been previously removed, and adding the resultant salt-containing liquor to untreated fluorine-containing liquor.

8. The method of claim 1 wherein the nitrate salt used in forming the insoluble fluorine compound is calcium nitrate.

9. The method of claim 1 wherein the nitrate salt used in forming the insoluble fluorine compound is magnesium nitrate.

10. The method of claim 5 wherein the nitrate salt used in forming the insoluble fluorine compound is potassium nitrate.

11. The method of claim 5 wherein the nitrate salt used in forming the insoluble fluorine compound is barium nitrate.

12. The method of claim 5 wherein the nitrate salt used in forming the insoluble fluorine compound is sodium nitrate.

13. The method of claim 1 wherein the agent capable of forming an insoluble nickel compound is a soluble carbonate.

14. The method of claim 1 wherein the agent capable of forming an insoluble nickel compound is a soluble cyanide.

15. The method of claim 1 wherein the agent capable of forming an insoluble nickel compound is a soluble oxalate.

16. The method of claim 1 wherein the agent capable of forming an insoluble nickel compound is sodium hydroxide.

17. The method of treating acidic aqueous pickling liquor containing fluorine, chromium, iron, nickel and nitrate values therein; said method comprising reacting said liquor with a soluble nitrate salt capable of forming an insoluble fluorine compound; removing said fluorine compound; ammoniating the remaining liquor to form a chromium and iron hydroxide precipitate; removing said precipitate; adding sufficient potassium chloride to the remaining liquor to convert the ammonium nitrate therein to potassium nitrate; heating the remaining liquor to about 180° F. and reacting the same with a soluble agent capable of forming an insoluble nickel compound; and drying the remaining liquor to recover a nitrate salt therefrom; said drying being carried out by heating said liquor to about 114° C. followed by cooling to about 25° C. to form a crystalline product.

18. The method of claim 17 wherein the nitrate salt reaction comprises first adding the nitrate salt to liquor from which the insoluble fluorine compound has been previously removed; and adding the resultant salt-containing liquor to untreated fluorine-containing liquor.

References Cited in the file of this patent

UNITED STATES PATENTS

| | | |
|---|---|---|
| 2,156,904 | Ruthruff | May 2, 1939 |
| 2,371,759 | King et al. | Mar. 20, 1945 |
| 2,441,668 | Mathers et al. | May 18, 1948 |
| 2,660,515 | Schwenzfeier et al. | Nov. 24, 1953 |
| 2,766,101 | Carosella et al. | Oct. 9, 1956 |
| 2,841,540 | Smith | July 1, 1958 |
| 2,865,709 | Horn et al. | Dec. 23, 1958 |
| 2,989,384 | Allen et al. | June 20, 1961 |

FOREIGN PATENTS

| | | |
|---|---|---|
| 787,749 | Great Britain | Dec. 18, 1957 |